US008879646B2

(12) United States Patent
Sturkovich

(10) Patent No.: US 8,879,646 B2
(45) Date of Patent: Nov. 4, 2014

(54) SPLIT MICROWAVE BACKHAUL ARCHITECTURE ALLOWING FOR BANDWIDTH CHANGES BETWEEN AN INDOOR AND OUTDOOR UNIT

(71) Applicant: Kobi Sturkovich, Netanya (IL)

(72) Inventor: Kobi Sturkovich, Netanya (IL)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/645,177

(22) Filed: Oct. 4, 2012

(65) Prior Publication Data
US 2013/0308691 A1    Nov. 21, 2013

Related U.S. Application Data

(60) Provisional application No. 61/647,457, filed on May 15, 2012.

(51) Int. Cl.
*H04L 27/00*    (2006.01)

(52) U.S. Cl.
USPC ........... 375/259; 375/219; 375/220; 375/222; 375/316; 375/260; 375/285; 375/296

(58) Field of Classification Search
CPC ................ H04L 1/00; H04L 1/0001–1/0006; H04L 1/0009; H04L 1/0033; H04L 1/004; H04L 1/0041; H04L 1/0042; H04L 1/007; H04L 1/0078; H04L 1/0086; H04L 1/009; H04L 1/206; H04L 1/208; H04L 2027/0061; H04B 7/18515; H04B 7/18582; H04B 7/1858; H04B 1/0475

USPC ......... 375/259, 219, 220, 222, 316, 260, 285, 375/296

See application file for complete search history.

(56) References Cited

U.S. PATENT DOCUMENTS

| 8,175,175 B1* | 5/2012 | Strasman et al. ............. 375/260 |
| 2005/0180415 A1* | 8/2005 | Cheung et al. ................ 370/389 |
| 2006/0095943 A1* | 5/2006 | Demircin et al. ................ 725/81 |
| 2008/0002581 A1* | 1/2008 | Gorsetman et al. ........... 370/232 |
| 2009/0290659 A1* | 11/2009 | Petrovic et al. ................ 375/340 |
| 2010/0272163 A1* | 10/2010 | Prager et al. .................. 375/220 |
| 2013/0136039 A1* | 5/2013 | Sturkovich et al. ........... 370/280 |

* cited by examiner

*Primary Examiner* — Siu Lee
(74) *Attorney, Agent, or Firm* — Sterne, Kessler, Goldstein & Fox P.L.L.C.

(57) ABSTRACT

A microwave backhaul architecture for remodulating data to increase a capacity of a corresponding wireless link is provided. The microwave backhaul architecture includes an indoor communication unit (IDU) configured to perform modulation and/or demodulation of the data and to perform a conversion of the data. The data is configured to have a modulation and baud rate dictated by performance capabilities of the IDU. The microwave backhaul architecture also includes an outdoor communication unit (ODU) configured to adjust at least one of the modulation and baud rate of the data in accordance with communication constraints to produce remodulated data. The ODU is configured to adjust the modulation and baud rate of the data such that the remodulated data has a higher-order modulation and lower baud rate when communicated over the wireless link than the modulation and baud rate of the data when communicated between the IDU and the ODU.

20 Claims, 8 Drawing Sheets

SPLIT MICROWAVE BACKHAUL ARCHITECTURE ALLOWING FOR BANDWIDTH CHANGES BETWEEN AN INDOOR AND OUTDOOR UNIT

CROSS REFERENCE TO RELATED APPLICATIONS

This application claims the benefit of U.S. Provisional Patent Application No. 61/647,457, filed May 15, 2012, which is incorporated herein by reference in its entirety.

FIELD OF THE INVENTION

The invention generally relates to microwave backhaul architecture, and more specifically to a split mount configuration supporting bandwidth changes between an indoor unit and an outdoor unit to increase modulation in the air.

BACKGROUND

Conventional microwave backhaul architectures are generally implemented as either a split outdoor unit (split ODU) configuration or an all outdoor unit (all ODU) configuration. Conventional split ODU configurations are generally comprised of both an indoor unit (IDU) and an outdoor unit (ODU), where the IDU and the ODU are connected over a single channel coaxial interconnect. The IDU in a conventional split ODU configuration typically includes a modem, a digital-to-analog converter and a baseband-to-intermediate frequency converter. Under normal operation, these conventional split ODU configurations generally involve transmitting an analog signal, at an intermediate frequency, over the single channel coaxial interconnect between the IDU and the ODU. However, during this transmission, the analog signal can be subjected to various errors, which can result from deficiencies associated with the IDU. Additionally, the lack of digital capabilities of these conventional ODUs generally render them ineffective in terms of correcting the errors within the analog signal. These issues can be further compounded in cases where the IDU may be a legacy device. In particular, when the IDU is a legacy device, the capacity of the microwave backhaul architecture is generally limited.

As the demand for higher capacity mobile backhaul networks continues to increase, the limitations associated with these conventional IDUs and ODUs will only become more problematic. In particular, mobile backhaul providers are experiencing a growing demand for increased capacity as well as a shift from voice services to data services. These factors are driving mobile backhaul networks towards high capacity IP/Ethernet connections. Additionally, the transition to 4G and LTE networks is also driving the need for higher capacity, and moving more packet traffic onto mobile backhaul networks. As a result, the limitations of conventional split ODU configurations make it increasingly difficult to meet these increasing user demands.

Generally, for conventional split ODU configurations to meet these increased capacity demands, both the conventional IDU and the conventional ODU (i.e. legacy devices) would need to be replaced with an upgraded IDU and ODU that each support higher capacity communication. However, even when a conventional microwave backhaul architecture is implemented having a higher capacity IDU and ODU, communication between the IDU and the ODU are typically still limited by the backhaul architecture's maximum wireless transmission capacity, which is dictated by a license. Additionally, having to replace both the IDU and the ODU in these conventional split ODU configurations may cause several deficiencies. For example, replacement of both the IDU and the ODU may increase replacement costs, may increase the time needed to complete the replacement process, and it may result in compatibility issues with existing infrastructure.

Thus, neither conventional split ODU configurations having legacy IDUs and ODUs, nor conventional split ODU configurations having upgraded IDUs and ODUs, effectively meet the increasing demands for capacity.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 6:
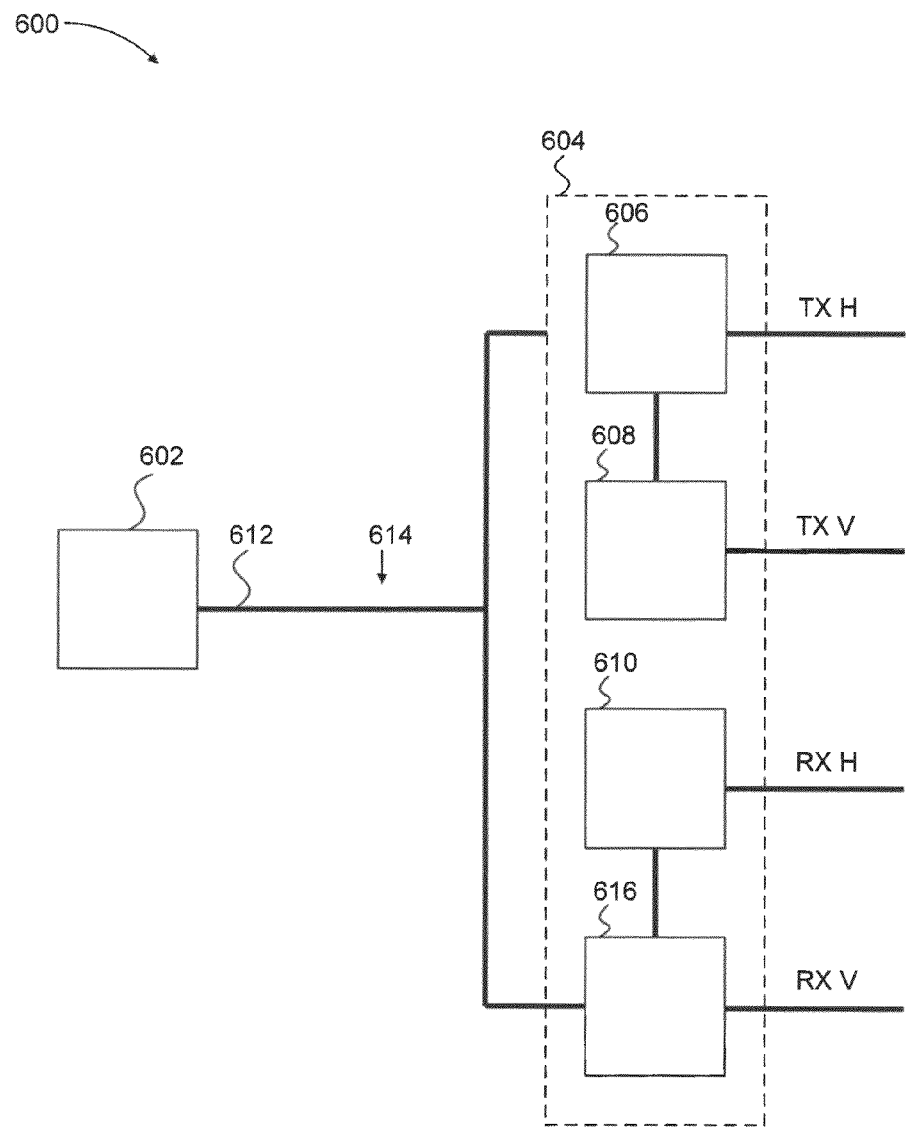
Figure 7:
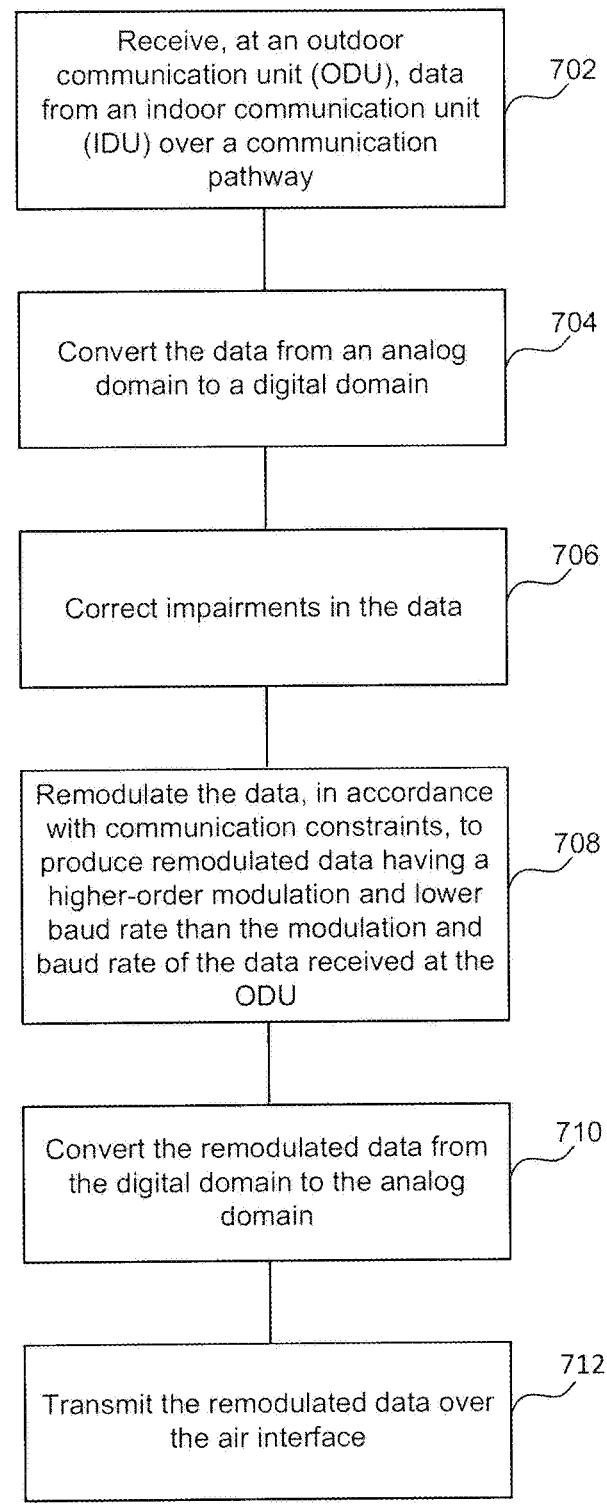

FIG. 6 illustrates a block diagram of a third microwave backhaul system having a dual channel configuration according to an exemplary embodiment of the present disclosure; and FIG. 7 is a flowchart of exemplary operational steps of adjusting a bandwidth between an indoor communication unit (IDU) and an outdoor communication unit (OUD) to increase a modulation over a wireless link according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Microwave Backhaul System

Figure 1:
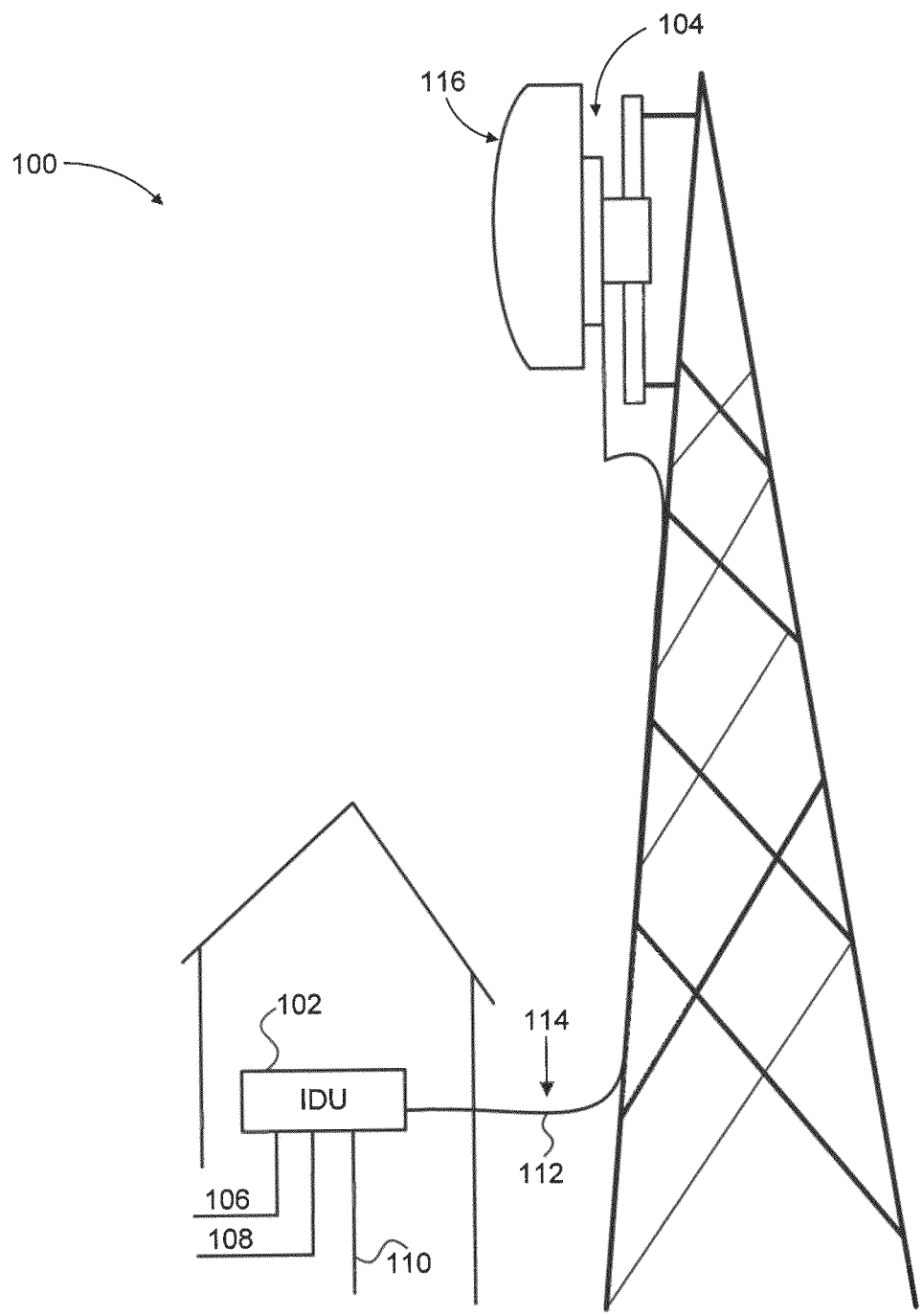
FIG. 1 illustrates a block diagram of a first microwave backhaul system according to an exemplary embodiment of the present disclosure.

FIG. 1 illustrates a block diagram of a first microwave backhaul system 100 that includes an indoor communication unit (IDU) 102 and an outdoor communication unit (ODU) 104 according to an exemplary embodiment of the present disclosure. Microwave, as used throughout this disclosure, refers to both terrestrial point-to-point (PtP) radio communications, as well as point-to-multipoint communications, and can include both wired and/or wireless communications.

Microwave backhaul system 100 initiates communication by accessing an information source, which can comprise, for example, audio data 106, video data 108, or any other data capable of being transmitted over an Internet Protocol (IP)/Ethernet connection 110. To facilitate this communication, IDU 102 is coupled to a core network. In particular, IDU 102 is configured to acquire one or more sequences of digital data (e.g., audio data 106, video data 108, data transmitted over IP/Ethernet connection 110, or the like) from the core network. IDU 102 can also be configured to support several additional services, such as Ethernet, time-division multiplexing (TDM), and control data that is aggregated over a radio link.

IDU 102 can be implemented at a location that is substantially removed from ODU 104, such as at a location at ground level. For example, IDU 102 can be positioned inside of a home or an office building, or the like. Conversely, ODU 104 can be implemented at a substantially elevated location, such as on top of a pole, on top of an antenna tower, on top of a building, or the like. In some embodiments, IDU 102 and ODU 104 can be separated by a distance up to approximately 300 meters; however other distances are possible.

IDU 102 and ODU 104 are connected via a communication pathway 112, which is configured such that data 114 can be transmitted between IDU 102 and ODU 104. Communication pathway 112 can comprise an Ethernet cable, a fiber optic cable, a coaxial cable, an intermediate frequency (IF) cable, a twisted pair cable, a shielded cable, a category 5 cable, a category 6 cable, or one or more copper wires. Therefore, depending on a chosen communication medium, communication pathway 112 can facilitate transmission of an analog signal or a digital signal between IDU 102 and ODU 104. In some embodiments, communication pathway 112 can be a wireless communication channel. Additionally, an antenna 116 can be coupled to ODU 104, and can be positioned close to ODU 104. Therefore, microwave backhaul system 100 is implemented such that data 114 can be transmitted from IDU 102, across communication pathway 112, to ODU 104, and subsequently to antenna 116 where communication over a wireless link (e.g. an air interface) can then be initiated. Also, microwave backhaul system 100 is implemented such that data 114 received by antenna 116 can be transmitted from ODU 104 over communication pathway 112 to IDU 102.

As will be discussed in greater detail below, ODU 104 can be a "smart ODU." For example, ODU 104 can be configured to remodulate (or retransmit) data 114, received from IDU 102, such that data 114 can be transmitted over the wireless link (e.g. the air interface) at a higher-order modulation than a modulation that data 114 may have had when being transmitted from IDU 102 to ODU 104. Similarly, ODU 104 can be configured to remodulate (or retransmit) data 114, received over the wireless link, such that data 114 can be transmitted over communication pathway 112 to IDU 102 at a lower-order modulation than a modulation that data 114 may have had when being transmitted over the wireless link. However, ODU 104 may not include all of the functionalities of a modem, which can instead be completely implemented within IDU 102 or split between the IDU 102 and ODU 104. Therefore, when ODU 104 is implemented as a "smart ODU," microwave backhaul system 100 can provide more efficient communication between IDU 102 and ODU 104, as well as over the wireless link. Additionally, the limitations generally associated with the transmission of data in conventional split ODU configurations are eliminated because of the digital capabilities, and the corresponding improved RF functionalities, of ODU 104. For example, ODU 104 can sample data 114 received from IDU 102 and then correct any detected errors (e.g. by removing noise from data 114), which can be associated with either the IDU 102 or the communication pathway 112. ODU 104 can then process data 114 such that it can be properly transmitted (at a higher-order modulation) over the wireless link.

As will also be discuss in greater detail below, communication pathway 112 can be a dual channel pathway. Implementing microwave backhaul system 100 having a dual channel communication pathway 112 can provide numerous advantages over both conventional microwave backhaul systems. For example, implementing communication pathway 112 as a dual channel pathway can effectively double the capacity of microwave backhaul system 100, while also overcoming typical challenges associated with dual channel communication such as LO leakage and inter-modulation distortion between channels, to provide some examples.

ODU 104 can also correct errors associated with a signal received over a wireless link via antenna 116. Microwave backhaul system 100 can also be configured to support adaptive coding and modulation (ACM), which provides a high reliability for microwave backhaul system 100 even in extreme weather, such as wind, rain, hail, or the like.

In some embodiments, specific functionality is offloaded from ODU 104 to IDU 102. The offloading of functionality (e.g. the modem assembly), while maintaining at least some RF functionality and remodulation (or retransmission) functionality within ODU 104, provides numerous advantages for microwave backhaul system 100 over conventional split ODU configurations. For example, by implementing the modem assembly within IDU 102, as opposed to ODU 104, power consumption by microwave backhaul system 100 can become more efficient. Similarly, it can be easier, and less expensive, to convey power to IDU 102 than ODU 104, because IDU 102 may be located at ground level, while ODU 104 may be located at an elevated level (e.g., on top of the pole, antenna tower, or the like). Thus, when more functional components are implemented in IDU 102 rather than ODU 104, the necessary power can be supplied to microwave backhaul system 100 at a lower cost. However, it will be apparent to those skilled in the related art(s) that other advantages can be realized without departing from the spirit and scope of the present disclosure.

Although the description of the present disclosure is to be described in terms of microwave backhaul architecture, those skilled in the relevant art(s) will recognize that the present disclosure can be applicable to other architectures without departing from the spirit and scope of the present disclosure.

Figure 2A:
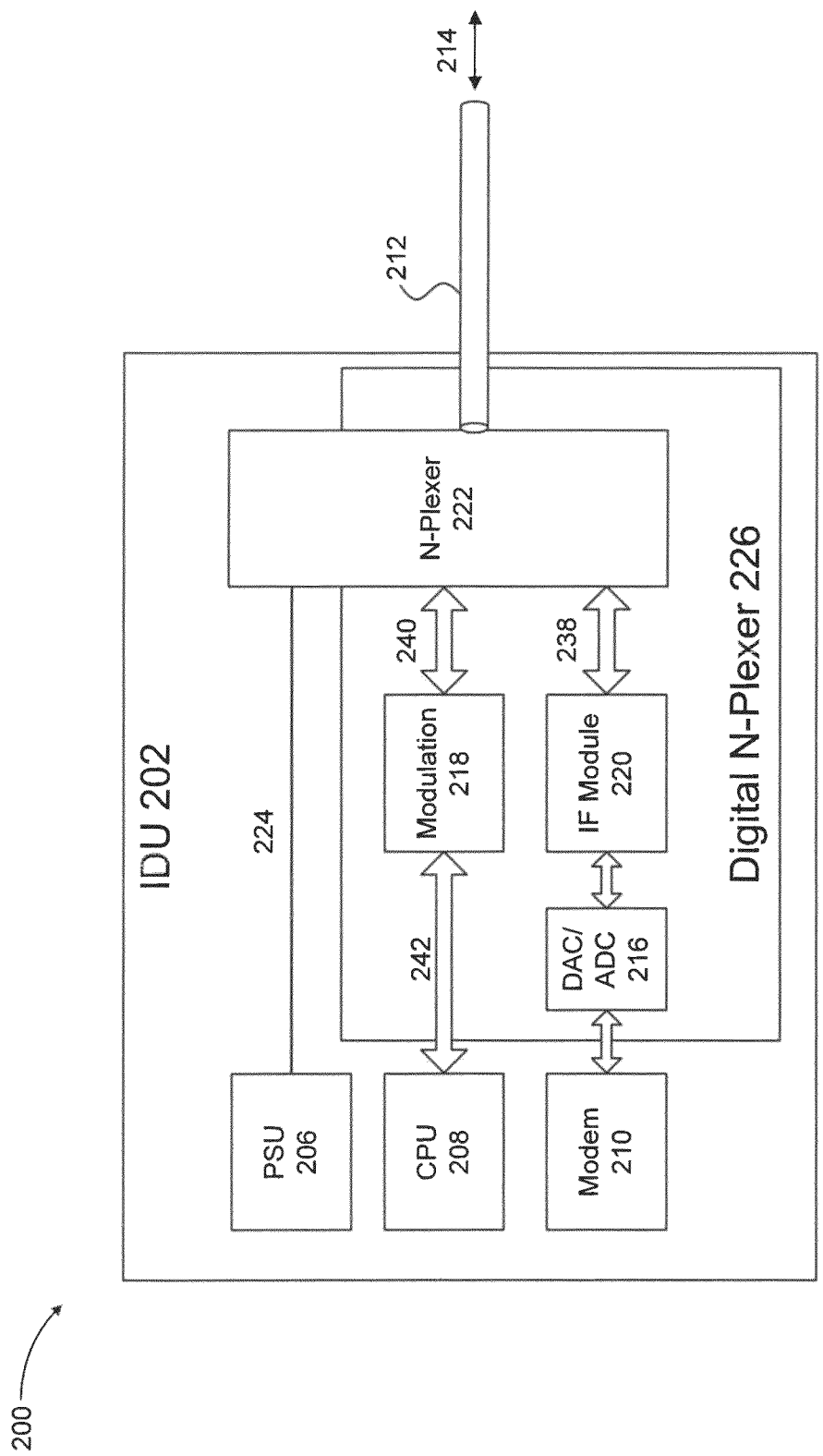
FIG. 2A illustrates a block diagram of an indoor communication unit (IDU) for implementation within a microwave backhaul system according to an exemplary embodiment of the present disclosure.
Figure 2B:
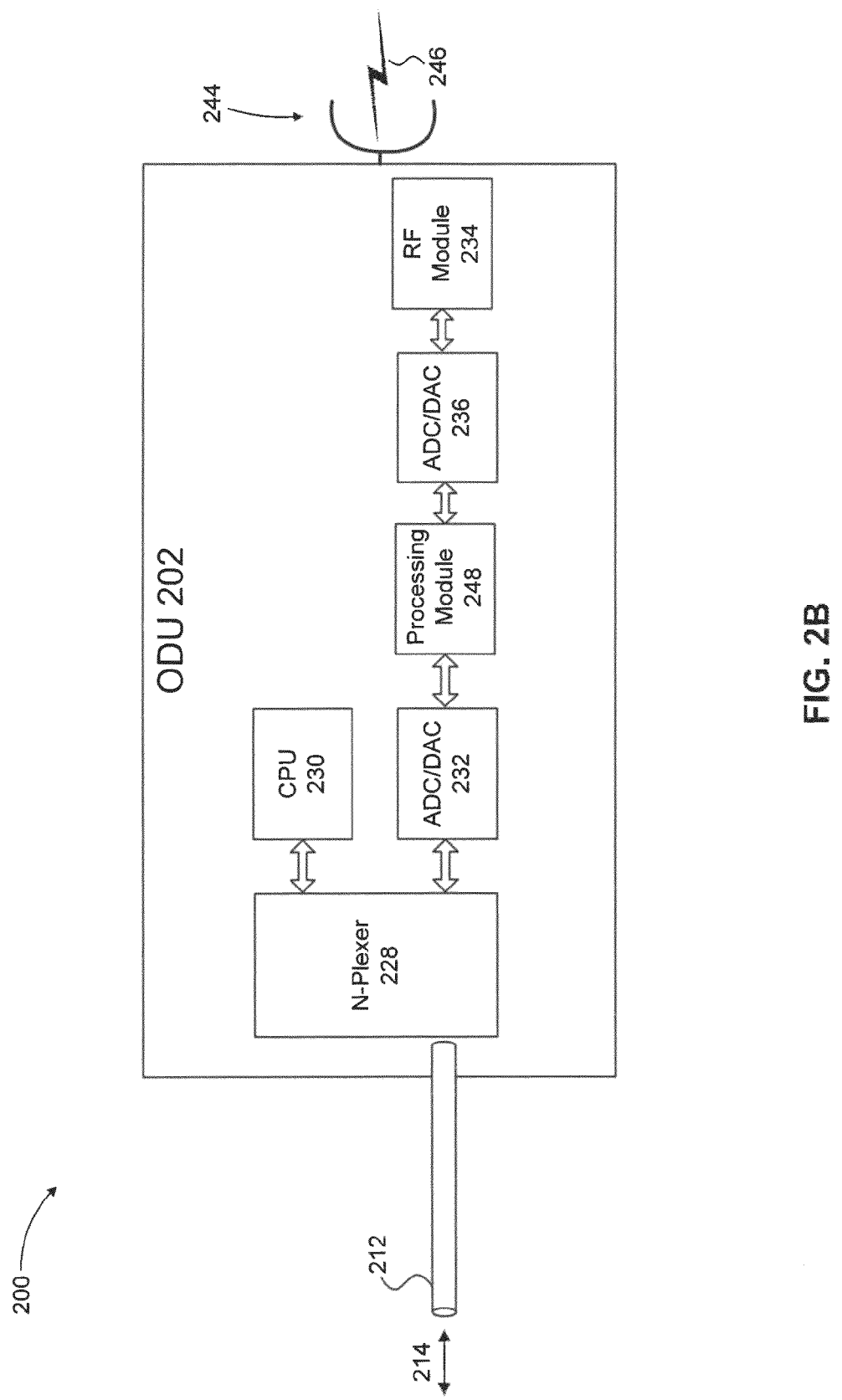
FIG. 2B illustrates a block diagram of an outdoor communication unit (ODU) for implementation within a microwave backhaul system according to an exemplary embodiment of the present disclosure.

An Exemplary IDU and ODU for Implementation within a Microwave Backhaul System FIGS. 2A and 2B illustrate block diagrams of an indoor communication unit (IDU) 202 and an outdoor communication unit (ODU) 204, respectively, for use within a microwave backhaul system 200 according to an exemplary embodiment of the present disclosure. IDU 202 and ODU 204 are coupled together via a communication pathway 212. IDU 202 can represent an exemplary embodiment of IDU 102 of FIG. 1, and ODU 204 can represent an exemplary embodiment of ODU 104 of FIG. 1.

IDU 202 includes a power supply unit (PSU) 206, a CPU 208, a modem assembly 210, a digital-to-analog converter/analog-to-digital converter (DAC/ADC) block 216, a modulation block 218, and an intermediate frequency (IF) module 220. In some embodiments, IDU 202 can also include an N-Plexer 222.

PSU 206 is configured to produce a DC output voltage 224. CPU 208 is configured to carry out instructions to perform arithmetical, logical, and/or input/output (I/O) operations of one or more of the aforementioned elements contained within IDU 202. In an embodiment, CPU 208 can control operation of modulation block 218 and N-Plexer 222.

Modem assembly 210 is configured to perform modulation and demodulation of data 214 that is to be transmitted between IDU 202 and ODU 204. In some embodiments, modem assembly 210 can function substantially similar to a baseband modem. Further, modem assembly 210 can be configured to cancel out noise associated with IDU 202 or communication pathway 212.

DAC/ADC block 216 can be configured to transmit and/or receive data from modem assembly 210. DAC/ADC block 216 is also configured to perform digital-to-analog and/or analog-to-digital conversions of data 214 such that data 214 is suitable for transmission over communication pathway 212.

Modulation block 218 can be configured to transmit and/or receive a signal 242 from CPU 208. Modulation block 218 can also be configured to perform various modulation and/or demodulation techniques. In an embodiment, modulation block 218 can be configured to perform amplitude-shift keying. For example, modulation block 218 can be configured to perform amplitude-shift keying by utilizing a finite number of amplitudes, where each amplitude is assigned a unique pattern of binary digits. Each pattern can then be configured to form the specific symbol that is represented by the particular amplitude. Additionally, when modulation block 218 is configured to perform demodulation, modulation block 218 determines the amplitude of the received signal and maps it back to the symbol it represents, thus recovering the original data.

IF module 220 can be configured to transmit and/or receive data from DAC/ADC block 216. IF module 220 is also configured to perform a frequency conversion of the received data such that data 214 is suitable for transmission over communication pathway 212. For example, IF module 220 can be configured to convert data 214 from baseband (BB), or near BB, to IF.

N-Plexer 222 can be configured to permit N-directional communication over communication pathway 212. In particular, N-Plexer 222 is configured to isolate IDU 202 from ODU 204, while permitting them to share a common antenna. N-Plexer 222 is also configured to receive DC output voltage 224 from PSU 206, to receive a control signal 240 (e.g. a Telemetry ASK signal) output from modulation block 218, and to receive an IF signal 238 output from IF module 220. Additionally, N-Plexer 222 can be configured to convert and/or combine each of these inputs to form data 214. N-Plexer 222 is also configured to transmit and/or receive data 214, over communication pathway 212, between IDU 202 and ODU 204. In an embodiment, N-Plexer 222 can function substantially as an analog duplexer (multiplexer/demultiplexer).

In some embodiments, communication pathway 212 can include one or more links (e.g. pathways). Communication pathway 212 can be configured to permit transmission of approximately four different signals between IDU 202 and ODU 204; however, transmissions of more or less signals are possible between IDU 202 and ODU 204. For example, communication pathway 212 can be configured to transmit a transmission communication signal (TX), a receipt communication signal (RX), an up control signal, and a down control signal. Additionally, or alternatively, communication pathway 212 can be configured to allow TX, RX, a Telemetry ASK signal (output from modulation block 218) and DC output voltage 224 to coexist on communication pathway 212. In an embodiment, communication pathway 212 can represent an IF cable, and thus the conversion to the analog domain of these signals can be performed at IDU 202 (e.g. by DAC/ADC block 216).

Further, communication pathway 212 can be a dual channel communication pathway, which can effectively double the capacity of microwave backhaul system 200. In some embodiments, the dual channel communication pathway can include a transmit pathway and a receive pathway, such that a portion of the bandwidth of the dual channel communication pathway is allocated into the transmit pathway to facilitate communication from IDU 202 to ODU 204, and a remaining portion of the bandwidth is allocated into the receive pathway to facilitate communication from the ODU 204 to the IDU 202. Additionally, dual channel communication pathway can include two bi-directional pathways, such that a first bi-directional pathway facilitates communication between a first IDU and a first ODU, and the second bi-directional pathway facilitates communication between a second IDU and a second ODU (see FIG. 5). Further, dual channel communication pathway can include two bi-directional pathways that each facilitate communication between the same two IDUs (or the same two ODUs) and the same single ODU (or the same single IDU). For example, each bi-directional pathway can handle a portion of the overall bandwidth between the two IDUs and the single ODU, thereby effectively doubling the capacity of microwave backhaul system. Additional characteristics of dual channel communication pathways will be discussed in detail below with references to FIGS. 5 and 6.

In an exemplary embodiment, DAC/ADC block 216, modulation block 218, IF module 220 and N-Plexer 222 can be replaced by Digital N-Plexer 226. In particular, Digital N-Plexer 226 can be configured to multiplex/demultiplex the required signal in the digital domain, rather than in the analog domain. Subsequently, Digital N-Plexer 226 can allow communication pathway 212 to be implemented as either a digital pathway or an analog pathway. Using Digital N-Plexer 226 allows for a simpler implementation of IDU 202. For example, when implementing IDU 202 having Digital N-Plexer 226, no analog functionality would be required, and instead only a single digital chip substrate would be needed. As a result, the cost of implementing IDU 202 can be decreased. Additionally, using a Digital N-Plexer 226 can provide an improved yield, shorter production testing, lower assembly cost, lower peripheral component count, and can support greater distances between IDU 202 and ODU 204, to provide some examples.

As illustrated in FIG. 2B, ODU 204 can also include an N-Plexer 228, which can be implemented in several different manners. For example, N-Plexer 228 can be an analog N-Plexer, a digital N-Plexer, or a split function N-Plexer (e.g., where N-Plexer 228 is partially analog and partially digital). When N-Plexer 228 represents a digital N-Plexer, N-Plexer 228 can function in a substantially similar manner as Digital N-Plexer 226. In particular, N-Plexer 228 can be configured to multiplex/demultiplex signals in the digital domain. N-Plexer 228 also allows for a simpler implementation of ODU 204 because no analog functionality would be required, and instead only a single digital chip substrate would need to be implemented within ODU 204. Therefore, the cost of implementing ODU 204 can also be decreased. Similar to Digital N-Plexer 226, implementing N-Plexer 228 within ODU 204 can provide an improved yield, shorter production testing, lower assembly cost, lower peripheral component count, and can support greater distances between IDU 202 and ODU 204, to provide some examples.

ODU 204 can also include a CPU 230, ADC/DAC blocks 232 and 236, a processing module 248, and an RF module 234. CPU 230 can be configured to function in a substantially similar manner as CPU 208. In particular, CPU 230 is configured to carry out instructions to perform arithmetical, logical, and/or I/O operations of one or more of the elements contained within ODU 204. In an embodiment, CPU 208 can control operation of N-Plexer 228.

ADC/DAC block 232 can be configured to transmit and/or receive data from N-Plexer 228. Both ADC/DAC blocks 232 and 236 are configured to perform analog-to-digital and/or digital-to-analog conversions of data 214 such that data 214 can be properly transmitted and/or received over wireless link 246.

Processing module 248 can be configured to preform mathematical manipulation techniques on data 214, such that data 214 may be modified or improved according to a desired processing method. For example, processing module 248 can be configured to measure, filter, or compress data 214 prior to being output to ADC/DAC block 236, such that error detection and/or error correction can be performed on data 214.

RF module 234 can be configured to transmit and/or receive data from ADC/DAC block 236. RF module 234 is also configured to perform a frequency conversion of data 214 such that data 214 can be properly received over communication pathway 212. For example, when data 214 is received at RF module 234, data 214 can have a frequency residing in the IF range. Therefore, RF module 234 can up-convert data 214 from IF to RF such that data 214 can then be communicated over wireless link 246. RF module 234 can also be configured to down-convert a signal received over wireless link 246 from RF to IF such that the received signal can be transmitted over communication pathway 212 to IDU 202.

In an embodiment, after data 214 is received, over communication pathway 212, at ODU 204, data 214 traverses through N-Plexer 228, to ADC/DAC block 232, to processing module 248, to ADC/DAC block 236, to RF module 234 and to an antenna 244 before being transmitted across wireless link 246. Similarly, after data 214 is received, over wireless link 246, at ODU 204, data 214 traverses from antenna 244 to RF module 234, to ADC/DAC block 236, to processing module 248, to ADC/DAC block 232, and to N-Plexer 228 before being transmitted over communication pathway 212.

An Exemplary Processing Module for Implementation within an ODU

Figure 3:
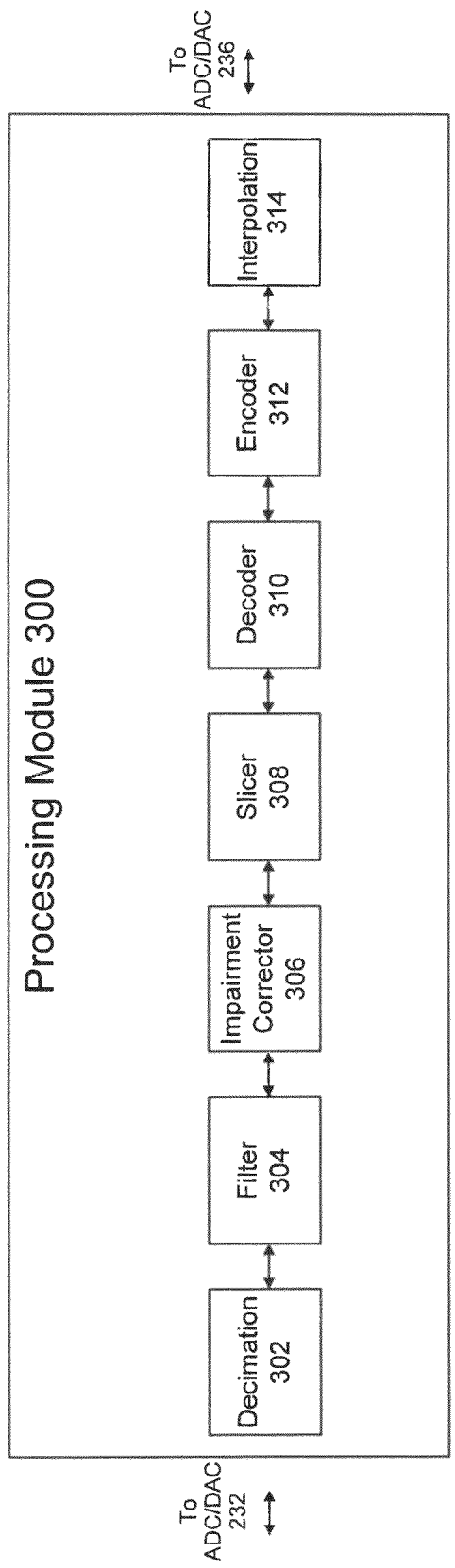
FIG. 3 illustrates a block diagram of a processing module for implementation within an ODU according to an exemplary embodiment of the present disclosure.

FIG. 3 illustrates a block diagram of a processing module 300 for implementation within an ODU according to an exemplary embodiment of the present disclosure. Processing module 300 may represent an exemplary embodiment of processing module 248 from FIG. 2B. Processing module 300 includes a decimation block 302, a filter 304, an impairment correction block 306, a slicer 308, a decoder block 310, an encoder block 312, and an interpolation block 314.

In an embodiment, processing module 300 may be disposed between ADC/DAC block 232 and ADC/DAC block 236, as shown in FIG. 2B. ADC/DAC block 232 may be configured to receive an analog signal having a low-order modulation and a high baud rate. ADC/DAC block 232 can then be configured to convert the analog signal into a digital signal, also having a low-order modulation and a high baud rate. Additionally, ADC/DAC block 232 outputs the digital signal to processing module 300.

Decimation block 302 can be configured to perform a decimation process on the digital signal (having a low-order modulation and a high baud rate) received from ADC/DAC 232. In particular, decimation block 302 can be configured to reduce the sampling rate of the digital signal. For example, the decimation process may be performed using a low-pass filter (e.g. an anti-aliasing filter) to reduce a bandwidth of the digital signal, and then downsampling the digital signal.

Filter 304 filters the digital signal. In some embodiments, filter 304 may be configured to perform numerous different filtering techniques. Additionally, filter 304 may include one or more filters. For example, filter 304 may include a low-pass filter, a pre-emphasis filter, or the like.

Impairment correction block 306 may be configured to receive the digital signal output from filter 304, and to correct any errors or impairments in the digital signal. In particular, impairment correction block 306 may be configured to sample the digital signal, look for frequency jumps, and record any such frequency jumps in the digital domain. Impairment correction block 306 may then inject a correction metric into the digital data to cancel out any errors or impairments. Additionally, or alternatively, impairment correction block 306 may also be configured to correct phase hits and microphonics hits, which can be caused by physical phenomenon interacting with ODU 204 such as wind, rain, hail, or the like. In an embodiment, impairment correction block 306 can also include a digital LO leakage cancellation feature and an image reduction feature. Further, impairment correction block 306 may be configured to correct any errors or impairments in the digital signal by performing a post-distortion process, or the like. For example, impairment correction block 306 can apply a polynomial (e.g. a correction metric) to the digital signal to correct any non-linearities caused by a corresponding IDU or communication pathway.

Slicer 308 may be configured to receive the digital signal output from impairment correction block 306, and to produce a series of symbols from the digital signal.

Decoder block 310 may be configured to decode the symbols received from slicer 308 using numerous different techniques. For example, decoder block 310 may decode the symbols using ideal observer decoding, maximum likelihood decoding, minimum distance decoding, syndrome decoding, Viterbi decoding, or the like. In particular, decoder 310 may be configured to convert the symbols into digital bits.

Conversely, encoder block 312 may be configured to encode the digital bits received from decoder block 310 using any suitable technique. In some embodiments, encoder block 312 may be configured to encode the digital bits using the same decoding technique implemented by decoder block, in a reverse manner. Additionally, encoder block 312 may be configured to encode (or remodulate) the digital bits such that they have a high-order modulation and low baud rate (e.g. the encoded digital bits having a higher-order modulation, and lower baud rate, than the modulation and baud rate of the digital signal input into processing module 300).

Interpolation block 314 may be configured to perform an interpolation process on the digital bits received from encoder block 312. In particular, using an interpolation process, interpolation block 314 can reconstruct the original digital signal input into processing module 300. However, the reconstructed digital signal produced by interpolation block 314 will have a high-order modulation and low baud rate.

ADC/DAC block 236 may be configured to receive the digital signal, having a high-order modulation and low baud rate, output from processing module 300. ADC/DAC block 236 can then be configured to convert the digital signal into an analog signal, also having a high-order modulation and low baud rate, such that the analog signal may be communicated over a wireless link at the high-order modulation and low baud rate.

Exemplary Microwave Backhaul Systems in Communication Over a Wireless Link

Figure 4:
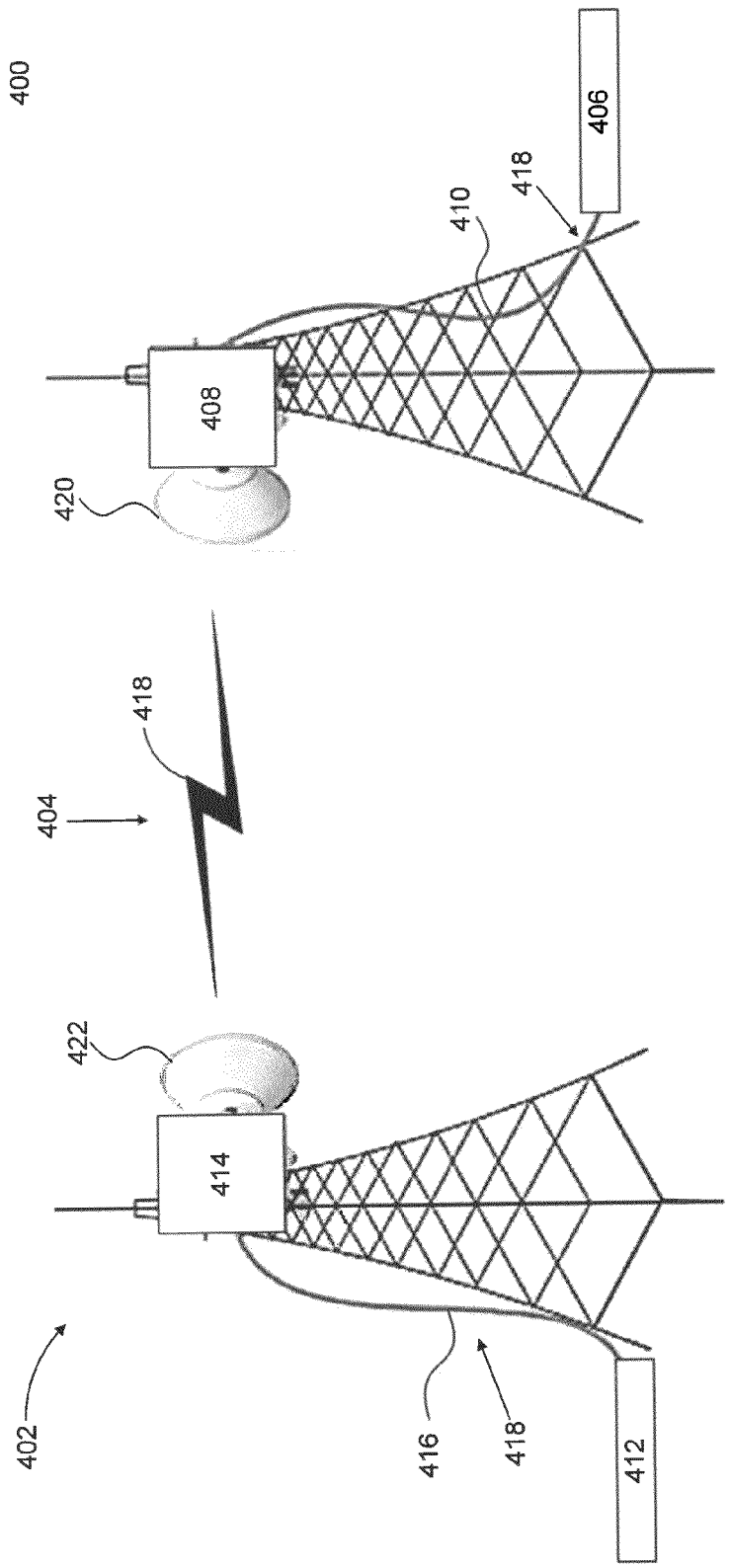
FIG. 4 illustrates a block diagram of multiple microwave backhaul systems, which are in communication over a wireless link, according to an exemplary embodiment of the present disclosure.

FIG. 4 illustrates a block diagram of a first microwave backhaul system 400 in communication with a second backhaul microwave system 402 over a wireless link 404 (e.g. a wireless link). First microwave backhaul system 400 includes a first IDU 406, a first ODU 408, and a first communication pathway 410 coupled between the first IDU 406 and the first ODU 408. Similarly, second microwave backhaul system 402 includes a second IDU 412, a second ODU 414, and a second communication pathway 416 coupled between the second IDU 412 and the second ODU 414. First and second microwave backhaul systems 400 and 402 can each represent an exemplary embodiment of microwave backhaul system 100 of FIG. 1. Additionally, first and second IDUs 406 and 412 can each represent an exemplary embodiment of IDU 202 of FIG. 2A, and first and second ODUs 408 and 414 can each represent an exemplary embodiment of ODU 104 of FIG. 1, or ODU 204 of FIG. 2B.

First microwave backhaul system 400 is configured to communicate data 418 between first IDU 406 and first ODU 408, and second microwave backhaul system 402 is configured to communicate data 418 between second IDU 412 and second ODU 414. First and second microwave backhaul systems 400 and 402 are also configured to communicate data 418 over wireless link 404, via a first antenna 420 communicably coupled to first ODU 408 and a second antenna 422 communicable coupled to second ODU 414. Additionally, first and second microwave backhaul systems 400 and 402 are each configured to adjust a bandwidth of data 418, as data 418 travels between first IDU 406 and first ODU 408, as well as between second IDU 412 and second ODU 414, such that a modulation of data 418 may be increased as data 418 travels over wireless link 404.

As discussed above, some conventional split outdoor unit configurations may consist of both a legacy IDU and a legacy ODU. These legacy devices may limit the capacity of the microwave backhaul system as a whole. For example, the legacy IDU and ODU may only be capable of transmitting data at a baud rate of approximately 56 MHz and having approximately 256 quadrature amplitude modulation (QAM), while upgraded IDUs and ODUs may be capable of transmitting data at a baud rate of approximately 112 MHz and having approximately 4096QAM. However, despite the increased capacity of the upgraded IDUs and ODUs, without replacing both the legacy IDU and legacy ODU, these conventional split outdoor unit configurations will be limited by the capacity of the remaining legacy device. Consequently, with conventional split outdoor unit configurations, a customer who wants to operate at a higher capacity would generally need to replace/upgrade both the IDU and the ODU, which can be costly and time consuming. Additionally, even when both the IDU and the ODU are upgraded, these conventional split outdoor unit configurations will still be limited by the capacity designated to the customer by its wireless license.

However, by implementing first and second ODUs 408 and 414 as "smart ODUs" (see FIG. 2B), neither first nor second microwave backhaul systems 400 and 402 will be limited by the transmission capacity, over wireless link 404, designated by a customer's wireless license. Additionally, implementing first and second ODUs 408 and 414 as "smart ODUs" may eliminate the need to replace/upgrade the IDUs. Therefore, first and second IDUs 406 and 412 may be implemented as upgraded IDUs or legacy IDUs. In particular, as discussed above, first and second ODUs 408 and 414 may be configured to have digital processing capabilities, such that first and second ODUs 408 and 414 can interface with first and second communication pathways 410 and 416, respectively, and remodulate data 418. Thus, first and second ODUs 408 and 414 may be configured to remodulate data 418 such that data 418 may be transmitted over wireless link 404 according to several different modulations. In some embodiments, first and second ODUs 408 and 414 may be configured to remodulate data 418 such that data 418 may be communicated over wireless link 404 having a highest possible modulation allowed under the customer's wireless license.

For example, first and second IDUs 406 and 412 may each be capable of transmitting data 418 at a baud rate of approximately 56 MHz and having approximately 256QAM; however, the customer's wireless license may only permit transmission of data 418 over wireless link 404 at a baud rate of approximately 28 MHz and approximately 256QAM. Typically, in conventional split outdoor unit configurations, transmission between the IDU and the ODU would be limited by the lower of these two capacities. Thus, in a conventional split outdoor unit configuration operating according to the exemplary capacities discussed above, transmission between the IDU and the ODU would generally be limited to approximately 28 MHz. However, by implementing first ODU 408 as a "smart ODU" (e.g. having digital processing capabilities), first IDU 406 can operate at its full capacity of approximately 56 MHz/256QAM, and first ODU 408 can then remodulate data 418 after being received from first IDU 406 over communication pathway 410.

In particular, first ODU 408 may be configured to remodulate data 418 such that data 418 may be transmitted over wireless link 404 at a high-order modulation, while also meeting the capacity requirements dictated by the customer's license for wireless link 404. For example, first ODU 408 may remodulate data 418 such that it may be transmitted over wireless link 404 at a rate of approximately 28 MHz/4096QAM, which would effectively increase the capacity of wireless link 404 by approximately 50%. In particular, transmitting data 418 between first IDU 406 and first ODU 408 at approximately 56 MHz (instead of 28 MHz) allows data 418 to be transmitted over wireless link 404 at the high-order modulation of approximately 4096QAM. Accordingly, first ODU 408 may down-convert data 418 to approximately 28 MHz to accommodate the customer's license for wireless link 404; however, data 418 may be transmitted between first ODU 408 and first IDU 406 at approximately 56 MHz because communication pathway 410 is not subject to such licensing restrictions.

After data 418 is transmitted across wireless link 404 (at a rate of approximately 28 MHz/4096QAM), data 418 may then be received by second ODU 414, via second antenna 422. Similar to first ODU 408, second ODU 414 may also be implemented as a "smart ODU" (e.g. having digital processing capabilities). Therefore, second ODU 414 may be configured to remodulate data 418 such that data 418 may be transmitted over communication pathway 416 at a high baud rate. For example, second ODU 414 may remodulate data 418 such that it is transmitted to second IDU 412 at a rate of approximately 56 MHz/256QAM (the maximum capability of second IDU 412). Therefore, by implementing first and second ODUs 408 and 414 as "smart ODUs," first and second microwave backhaul systems 400 and 402 are capable of adjusting a bandwidth of data 418 between the IDUs and the ODUs such that data 418 can be transmitted over wireless link 404 at a high-order modulation. The capacities of first and second IDUs 406 and 412 and wireless link 404, as well as the modulation of data 418 enumerated above are provided for illustrative purposes only, and are not intended to be the only capacities and modulation capable of being used herein, and are not meant to limit this disclosure. In particular, any IDU and customer license of the wireless link may be used herein.

An Exemplary Dual Channel Microwave Backhaul System

Figure 5:
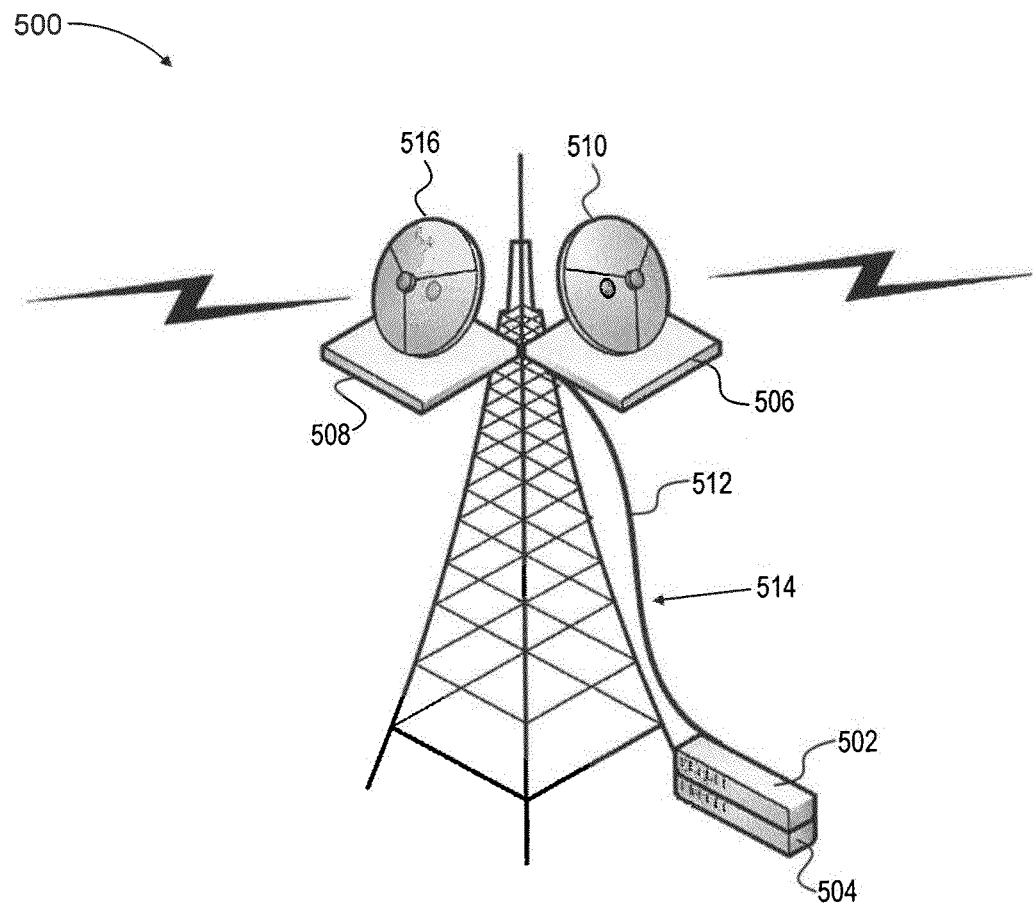
FIG. 5 illustrates a block diagram of second microwave backhaul system having a dual channel configuration according to an exemplary embodiment of the present disclosure.

FIG. 5 illustrates a block diagram of a microwave backhaul system 500 having a dual radio configuration, which includes two IDUs 502 and 504, and two ODUs 506 and 508 according to an exemplary embodiment of the present disclosure. IDUs 502 and 504, and ODUs 506 and 508 are coupled together via a dual channel communication pathway 512. IDUs 502 and 504 can each represent an exemplary embodiment of IDU 202 of FIG. 2A, and ODUs 506 and 508 can each represent an exemplary embodiment of ODU 204 of FIG. 2B, and/or first and second ODUs 408 and 414 of FIG. 4.

Dual channel communication pathway 512 can be implemented within any of the microwave backhaul systems described above (e.g. microwave backhaul systems 100, 200, 400 and/or 402). In embodiments where dual channel communication pathway 512 is implemented within split microwave backhaul architectures, the ODU is configured to transmit/receive two channels from various configurations and to flexibly configure the channels such that they can traverse through an air interface.

Similar to the discussion above for a single channel communication pathway (see FIG. 4), microwave backhaul system 500 can be implemented to adjust a bandwidth of data 514 between IDUs 502 and 504 and ODUs 506 and 508 to increase a modulation of data 514 as it is transmitted across the air interface. For example, IDUs 502 and 504 may each be capable of transmitting data 514 at a baud rate of approximately 56 MHz and having approximately 256QAM, while the customer's wireless license may only permit transmission of data 514 over the air interface at a baud rate of approximately 28 MHz and approximately 256QAM. However, by implementing ODUs 506 and 508 as "smart ODUs" (e.g. having digital processing capabilities), IDUs 502 and 504 can still operate at their full capacities of approximately 56 MHz/256QAM, despite the customer's wireless license only permitting transmission of data 514 over the air interface at a baud rate of approximately 28 MHz and approximately 256QAM. In an embodiment, each IDU may communicate with a corresponding ODU via one of the two channels that comprise dual channel communication pathway 512. Therefore, ODUs 506 and 508 may each receive a signal from a corresponding IDU at a baud rate of approximately 56 MHz and approximately 256QAM. ODUs 506 and 508 can then remodulate their respective signals after being received from one of the IDUs over dual channel communication pathway 512. In particular, ODUs 506 and 508 may be configured to remodulate the respective signals such that each signal may be transmitted over the air interface via two separate antennas 510 and 516, while also meeting the capacity requirements dictated by a customer's license for the air interface. For example, ODUs 506 and 508 may each remodulate their respective signals such that each signal may be transmitted over the air interface at a rate of approximately 28 MHz/256QAM. In particular, transmitting data 514 between the IDUs and the ODUs at approximately 56 MHz (instead of 28 MHz) allows data 514 to be transmitted over the air interface as two separate signals, each having a rate of approximately 28 MHz/256QAM.

The capacities of IDUs 502 and 504 and the air interface, as well as the modulation and baud rate of data 514 enumerated above are provided for illustrative purposes only, and are not intended to be the only capacities and modulation capable of being used herein, and are not meant to limit this disclosure. In particular, any IDU and customer license of the air interface may be used herein.

In some embodiments, dual channel communication pathway 512 can include two adjacent channels, two non-adjacent channels, or a dual channel over a single cable, to provide some examples. In some embodiments, dual channel communication pathway 512 can comprise two non-adjacent channels that are flexibly configured to support numerous different backhaul configurations over a wide range of operating parameters. Implementing communication pathway 512 having two channels, rather than only a single channel, may effectively double the capacity of microwave backhaul system 500, which can be significantly important as the demand for higher capacity mobile backhaul networks continues to grow.

In embodiments, dual channel communication pathway 512 can support other double capacity configurations such as multiple-input and multiple-output (MIMO) spatial multiplexing and radio optimized network planning, to provide some examples.

In some embodiments, dual channel communication pathway 512 can allow single chip cross polarization interference cancellation (XPIC) to be performed to increase a transmission capacity between ODUs 506 and 508, and IDUs 502 and 504. Additionally, or alternatively, dual channel communication pathway 512 can be configured to enable non-adjacent channel capacity aggregation, which can facilitate a relatively easy deployment of dual channel communication pathway 512 as well as ODUs 506 and 508. Dual channel communication pathway 512 can be further configured to provide radio-link bonding to support an efficient link protection.

FIG. 6 illustrates a block diagram of a microwave backhaul system 600 that includes an IDU 602 and an ODU 604 according to an exemplary embodiment of the present disclosure. IDU 602 and ODU 604 are coupled together via a communication pathway 612. IDU 602 can represent an exemplary embodiment of IDU 202 of FIG. 2A or IDUs 406 and 412 of FIG. 4, and ODU 604 can represent an exemplary embodiment of ODU 204 of FIG. 2B, and/or ODUs 408 and 414 of FIG. 4.

Microwave backhaul system 600 represents a split ODU configuration that supports a full cross polarization interference cancellation (XPIC) configuration. Similar to the discussion above for a dual channel communication pathway (see FIG. 5), microwave backhaul system 600's full XPIC configuration can be configured to adjust a bandwidth of data 614 between IDU 602 and ODU 604 to increase a modulation of data 614 as it is transmitted across the air interface. Accordingly, microwave backhaul system 600's full XPIC configuration can effectively increase a transmission capacity over the air interface by approximately 50%. In some embodiments, ODU 604 may include first and second transmission chips 606 and 608, as well as first and second receipt chips 610 and 616. Therefore, ODU 604 may be configured to transmit/receive two parallel communication channels over the same air interface, each channel having orthogonal polarizations.

For example, IDU 602 may be configured to transmit data 614 to ODU 604 at a baud rate of approximately 56 MHz and having approximately 256QAM, while the customer's wireless license may only permit transmission of data 614 over the air interface at a baud rate of approximately 28 MHz and approximately 256QAM. However, by implementing ODU 604 as a "smart ODU" (e.g. having digital processing capabilities), IDU 602 can still operate at its full capacity of approximately 56 MHz/256QAM, despite the customer's wireless license only permitting transmission of data 514 over the air interface at a baud rate of approximately 28 MHz and approximately 256QAM.

In an embodiment, ODU 604 may receive data 614, at first transmission chip 606, from IDU 602 at a baud rate of approximately 56 MHz and approximately 256QAM. A portion of data 614 may then be transmitted from first transmission chip 606 to second transmission chip 608. First transmission chip 606 may be configured to process a first portion of data 614, such that the first portion of data 614 is then transmitted over the air interface having a horizontal polarization (TX H). Similarly, second transmission chip 608 may be configured to process a second portion of data 614, such that the second portion of data 614 is then transmitted over the air interface having a vertical polarization (TX V). ODU 604 may also be configured to remodulate both the first and second portions of data 614 such that each signal may be transmitted over the air interface at modulation rates that meet the capacity requirements dictated by a customer's license for the air interface. For example, ODU 604 may remodulate the first and second portions of data 614 such that each portion may be transmitted over the air interface at a rate of approximately 28 MHz/256QAM. Alternatively, ODU 604 may remodulate the first and second portions of data 614 such that each portion may be transmitted over the air interface at a rate of approximately 14 MHz/4096QAM.

As discussed above, ODU 604 may also be configured to receive two parallel communication channels having orthogonal polarizations over the same air interface. For example, first receipt chip 610 may be configured to receive a first portion of data 614 having a horizontal polarization (RX H) over the air interface, while second receipt chip 616 may be configured to receive a second portion of data 614 having a vertical polarization (RX V) over the air interface. The first and second portions of data 614, received by first and second receipt chips 606 and 616, may have rates of approximately 28 MHz/256QAM or approximately 14 MHz/4096QAM, to provide some examples. Upon receipt of the second portion of data 614 by second receipt chip 616, the second portion of data 614 is transmitted to first receipt chip 606 where it is combined with the first portion of data 614 received by first receipt chip 606. ODU 604 may then remodulate, combine and process the first and second portions of data 614, such that they may then be transmitted over communication pathway 612 to IDU 602 at a rate of approximately 56 MHz/256QAM (the full capacity of IDU 602).

The capacities of IDU 602 and the air interface, as well as the modulation of data 614 enumerated above are provided for illustrative purposes only, and are not intended to be the only capacities and modulation capable of being used herein, and are not meant to limit this disclosure. In particular, any IDU and customer license of the air interface may be used herein.

Therefore, implementing the microwave backhaul systems disclosed herein with one or more "smart ODUs" may provide higher capacity communication without having to replace a legacy IDU with an upgraded IDU. In some embodiments, implementation of the "smart ODUs" may increase the performance of the microwave backhaul systems by a factor of 2 or 3; however, other magnitudes of performance enhancements are possible without departing from the spirit and scope of the present disclosure. Additionally, implementing the microwave backhaul systems disclosed herein with one or more "smart ODUs" may prevent the microwave backhaul systems from being limited by the capacities of the IDU, or by a customer's license for transmission over the air interface. Further, eliminating the need to replace an existing IDU may decrease replacement costs, may decrease the time needed to complete the replacement process, and it may substantially reduce any issues that may arise relating to the compatibility between upgraded devices and the existing infrastructure.

An Exemplary Method of Correcting Errors within a Dual Channel Microwave Backhaul System FIG. 7 is a flowchart of exemplary method for remodulating data at an outdoor communication unit (ODU) to increase a capacity of a wireless link according to an exemplary embodiment of the present disclosure. The flowchart of FIG. 7 is described with reference to embodiments of FIGS. 1-6. However, a method 700 is not limited to these embodiments.

Method 700 begins at step 702 where the data is received at the ODU from a corresponding indoor communication unit (IDU). The data may be communicated between the IDU and the ODU via, a communication pathway. Additionally, the data may have a modulation and a baud rate that is dictated by the performance capabilities of the IDU. The data may represent an exemplary embodiment of data 418 from FIG. 4, the ODU may represent an exemplary embodiment of ODUs 408 and/or 414 from FIG. 4, the IDU may represent an exemplary embodiment of IDUs 406 and/or 412 from FIG. 4, and the communication pathway may represent an exemplary embodiment of communication pathway 410 from FIG. 4.

In step 704, the data is converted from an analog domain to a digital domain such that various processing techniques can be performed on the data in the digital domain.

In step 706, impairments that may be present in the data are corrected. For example, the digital data may be sampled and analyzed for frequency jumps, and when any frequency jumps occur, they may be recorded in the digital domain. Additionally, impairments in the data may be corrected by injecting a correction metric into the digital data to cancel out any impairments. In an embodiment, phase hits and/or microphonics hits may also be corrected. Any impairments in the data may be corrected by utilizing a digital LO leakage cancellation feature, an image reduction feature, by performing a post-distortion process, or the like.

In step 708, the data is remodulated in accordance with communication constraints of the microwave backhaul system. The communication constraints may include a customer's license for communication over the wireless link, the performance capabilities of the IDU, performance capabilities of the ODU, and a capacity of the communication pathway. In an embodiment, the modulation and baud rate of the data may be adjusted such that the remodulated data has a higher-order modulation and a lower baud rate than the modulation and baud rate of the data received at the ODU from the IDU. For example, the remodulated data may have a modulation of approximately 4096QAM and a baud rate of approximately 28 MHz, while the original data may have a modulation of approximately 256QAM and a baud rate of approximately 56 MHz.

In step 710, the remodulated data is converted from the digital domain to the analog domain such that the remodulated data may be properly communicated over the wireless link.

In step 712, the remodulated data is transmitted over the wireless link. In an embodiment, the remodulated data may be transmitted over the wireless link at a higher order modulation and lower baud rate than the modulation and baud rate of the data transmitted from the IDU to the ODU. In particular, the remodulated data may be transmitted over the wireless link at a higher-order modulation a modulation that is capable of being produced by the IDU. In some embodiments, the capacity of the wireless link may be increased by approximately 50%.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A microwave backhaul system, comprising:
   an indoor communication unit (IDU), having a modem assembly and an N-Plexer, configured to perform modulation/demodulation of data and to perform a conversion of the data, wherein the data has a modulation and baud rate dictated by performance capabilities of the IDU; and
   an outdoor communication unit (ODU), having a processing module, a first and a second conversion block, and an RF module with digital capabilities, configured to adjust at least one of the modulation and baud rate of the data in accordance with communication constraints to produce remodulated data, wherein the processing module is configured to correct impairments in the data, and
   wherein the remodulated data has at least one of a different modulation or a different baud rate when communicated over a wireless link than the modulation and baud rate of the data when the data is communicated between the IDU and the ODU.

2. The microwave backhaul system of claim 1, wherein the communication constraints include at least one of a customer's license for communication over the wireless link, the performance capabilities of the IDU, performance capabilities of the ODU, and a capacity of a communication pathway between the IDU and the ODU.

3. The microwave backhaul system of claim 2, wherein the remodulated data has a higher-order modulation and a lower baud rate than the modulation and baud rate of the data.

4. The microwave backhaul system of claim 3, wherein the remodulated data is configured to have a highest possible modulation in accordance with the customer's license for communication over the wireless link.

5. The microwave backhaul system of claim 1, wherein the ODU is configured to facilitate communication of the remodulated data over the wireless link such that a capacity of the wireless link is increased by approximately 50%.

6. The microwave backhaul system of claim 2, wherein the ODU is further configured to adjust a bandwidth of the data in accordance with the communication constraints.

7. The microwave backhaul system of claim 1, further comprising a communication pathway configured to communicate the data between the IDU and the ODU at the modulation and baud rate dictated by the performance capabilities of the IDU.

8. The microwave backhaul system of claim 7, wherein the communication pathway is a dual channel communication pathway configured to support at least one of multiple-input and multiple-output (MIMO) spatial multiplexing, full cross polarization interference cancellation (XPIC), and radio optimized network planning.

9. The microwave backhaul system of claim 1, wherein the ODU is configured to facilitate communication of the remodulated data at a bandwidth of up to approximately 112 MHz and a modulation of up to approximately 4096QAM.

10. An outdoor communication unit (ODU) for implementation within a microwave backhaul system, comprising:
    a first and a second conversion block configured to convert data between an analog and a digital domain;
    a processing module configured to adjust at least one of a modulation and a baud rate of the data in accordance with communication constraints to produce remodulated data and to correct impairments in the data, wherein the remodulated data has at least one of a different modulation or a different baud rate than the modulation and baud rate of the data received at the processing module; and an RF module, having digital capabilities, configured to facilitate communication of the remodulated data over a wireless link.

11. The ODU of claim 10, wherein the processing module comprises:
- an impairment correction block configured to correct impairments in the data;
- a slicer configured to produce a series of symbols from the data;
- a decoder block configured to decode the symbols and to convert the symbols into digital bits;
- an encoder block configured to encode the digital bits and to remodulate the digital bits; and
- an interpolation block configured to perform an interpolation process on the digital bits to produce the remodulated data.

12. The ODU of claim 11, wherein the impairment correction block is configured to correct the impairments in the data by performing at least one of a digital local oscillator (LO) leakage cancelation process, an image reduction process, a post-distortion process, and a correction metric injection process.

13. The ODU of claim 11, wherein the communication constraints include at least one of a customer's license for communication over the wireless link, performance capabilities of a corresponding indoor unit (IDU), performance capabilities of the ODU, and a capacity of a corresponding communication pathway.

14. The ODU of claim 13, wherein the remodulated data has a higher-order modulation and a lower baud rate than the modulation and baud rate of the data.

15. The ODU of claim 14, wherein the remodulated data is configured to have a highest possible modulation in accordance with the customer's license for communication over the wireless link.

16. The ODU of claim 15, wherein the ODU is configured to facilitate communication of the remodulated data over the wireless link such that a capacity of the wireless link is increased by approximately 50%.

17. The ODU of claim 13, wherein the ODU is further configured to adjust a bandwidth of the data in accordance with the communication constraints.

18. A method of remodulating data at an outdoor communication unit (ODU) to increase a capacity of a wireless link, comprising:
- receiving, at the ODU, the data from an indoor communication unit (IDU) over a communication pathway, wherein the data has a modulation and baud rate dictated by performance capabilities of the IDU;
- converting the data from an analog domain to a digital domain;
- correcting impairments in the data;
- remodulating the data, in accordance with communication constraints, to produce remodulated data having a higher-order modulation and lower baud rate than the modulation and baud rate of the data received at the ODU;
- converting the remodulated data from the digital domain to the analog domain; and
- transmitting the remodulated data over the wireless link.

19. The method of claim 18, wherein the communication constraints include at least one of a customer's license for communication over the wireless link, the performance capabilities of the IDU, performance capabilities of the ODU, and a capacity of the communication pathway.

20. The method of claim 19, wherein the ODU is configured to facilitate communication of the remodulated data over the wireless link such that the capacity of the wireless link is increased by approximately 50%.

* * * * *